//www.example.com
United States Patent [19]

Hagerer et al.

[11] Patent Number: 4,875,889
[45] Date of Patent: Oct. 24, 1989

[54] COMBINE CROP MATERIAL FLOW ADJUSTMENT SYSTEM

[75] Inventors: Paul Hagerer; Fritz Glaser; Josef W. Klimmer; Reinhard Kunze, all of Zweibrucken, Fed. Rep. of Germany

[73] Assignee: Deere & Company, Moline, Ill.

[21] Appl. No.: 253,834

[22] Filed: Oct. 5, 1988

[30] Foreign Application Priority Data

Oct. 5, 1987 [DE] Fed. Rep. of Germany ....... 3733619

[51] Int. Cl.4 ...................... A01F 12/00; A01F 12/46
[52] U.S. Cl. .......................................... 460/1; 56/10.2; 56/DIG. 15; 460/5; 460/8; 460/114; 460/901
[58] Field of Search ......... 130/27 AE, 27 R, DIG. 1, 130/DIG. 2; 56/10.2, DIG. 5, DIG. 10, DIG. 15; 209/264, 416; 460/1, 5, 8, 114, 901

[56] References Cited

U.S. PATENT DOCUMENTS

| | | | |
|---|---|---|---|
| 2,382,965 | 8/1945 | Appel | 130/27 AE |
| 2,732,941 | 1/1956 | Deiss | 130/27 AE X |
| 3,092,116 | 6/1963 | Stroburg et al. | 130/27 AE |
| 3,939,846 | 2/1976 | Drozhzhin et al. | 56/DIG. 15 X |
| 4,259,829 | 4/1981 | Strubble | 56/DIG. 15 X |
| 4,490,964 | 1/1985 | Eldredge | 56/DIG. 15 X |
| 4,517,792 | 5/1985 | Denning et al. | 56/DIG. 15 X |
| 4,677,991 | 7/1987 | Harris et al. | 130/27 AE |

Primary Examiner—Stephen J. Novosad

[57] ABSTRACT

An agricultural combine has a generally horizontal grain pan for delivering threshed crop material to a grain cleaning mechanism. The grain pan includes a plurality of generally upright fore-and-aft extending vanes that are adjustable to deflect crop material toward either lateral side of the grain pan to compensate for the gravity influenced migration of grain toward the downhill side of the combine when operating on a side slope. The vanes are automatically controlled by an electrical system that includes sensors at opposite sides of the grain pan that detect the building of crop material on the downhill side of the combine and adjusts the vanes to compensate for the buildup.

6 Claims, 2 Drawing Sheets

COMBINE CROP MATERIAL FLOW ADJUSTMENT SYSTEM

BACKGROUND OF THE INVENTION

This invention relates to agricultural combines and more particularly to an improved system for compensating for the downhill drift of crop material in the combine when the combine is operating on side hills.

The grain separating mechanism of a conventional combine, as opposed to an axial flow-type combine, includes an axially transverse threshing cylinder and concave and a bank of straw walkers behind the threshing cylinder. Grain and other crop material, such as chaff, passing through the concave and the straw walkers falls onto a generally horizontal conveyor for delivering the crop material to a grain cleaning mechanism, which separates the clean grain from the chaff and other crop material.

A long standing problem for this type of machine has been the tendency of crop material to migrate to the downhill side of the combine when the combine is being operated on uneven terrain, the steeper the lateral slope of the combine, the greater the problem. The buildup of crop material on the downhill side of the machine either requires the operator to slow down the machine to reduce the overall flow rate of crop material through the machine, so that the downhill side of the grain separating mechanism is not overloaded, or alternately to accept higher grain losses that result from an overload of one side of the grain cleaning and separatin mechanisms within the machine.

One solution to the problem has been to provide for vertical adjustment of the combine wheels, so that the combein body and the separating mechanisms therein are maintained in a generally level condition. Another solution has been to provide for self-leveling of just the cleaning shoe portion of the separator, so that the crop material does not overload the downhill side of at least the cleaning mechanism. However, both of these solutions are relatively expensive and complicated.

A more economical and practical partial solution to the problem has been to provide generally upright, fore-and-aft vanes in the material conveying systems, including the conveyor that delivers crop material to the cleaning shoe, or some other means of channelizing the flow of crop material, so that it does not all collect on the downhill side of the machine. It is also known to provide for lateral adjustment of such vanes, so that the crop material is directed toward the uphill side of the machine to compensate for the gravity influenced downhill drift of crop material. Such a system is shown in U.S. Pat. No. 2,189,706, which discloses angularly adjustable vanes, with a pendulum-type control mechanism for automatically adjusting the angle of the vanes according to the degree of lateral inclination of the combine operating on a side hill.

SUMMARY OF THE INVENTION

According to the present invention, there is provided an improved system for automatically adjusting guide vanes in the combine separating system to compensate for the gravity induced migration of crop material to the downhill side of the machine when operating on a side hill.

An important feature of the invention resides in the provision of a system that is responsive to the actual buildup of crop material on the downhill side of the machine. More specifically, sensors are provided on opposite sides of the mechanism that conveys crop material to the cleaning mechanism to detect the difference in the mat of crop material on opposite sides of the machine and immediately adjust the crop deflecting vanes to compensate for said difference.

Still more specifically, such sensors are provided that produce electric signals responsive to the condition of the layer of crop material, and the electric signals are fed to an on-board computer or processor that controls an actuating mechanism that adjusts the angle of the vanes. Thus, the vanes are immediately and continuously adjusted according to the exact condition of the mat of crop material moving through the machine.

DESCRIPTION OF THE PREFERRED EMBODIMENT

Figure 1:
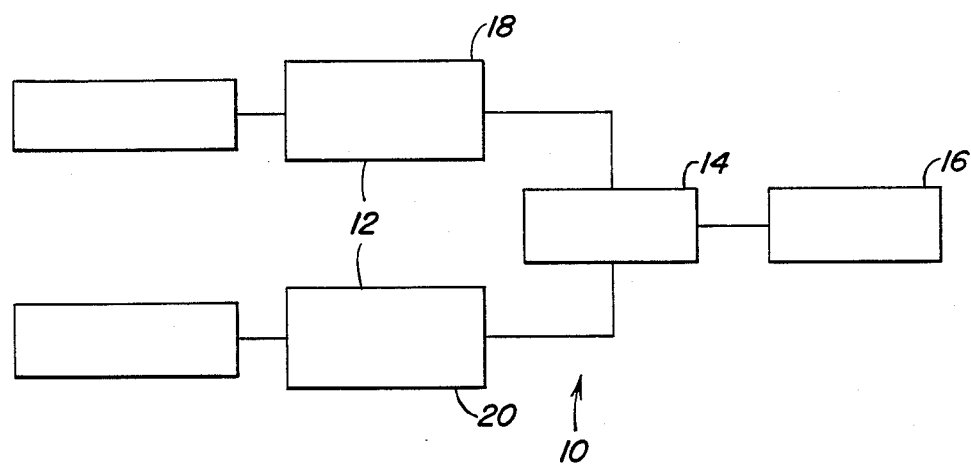
FIG. 1 is a schematic drawing showing the control system for controlling the adjustment of the crop deflecting vanes in the combine.

FIG. 1 schematically shows the overall control circuit 10 for automatically controlling the position of the vanes, the circuit including sensing means 12 that provides input to a controller 14, preferably an on-board microprocessor that may be programmed internally or externally. The controller is connected to a guide means 16, which preferably includes some type of motor, either electric, hydraulic or pneumatic, which is controlled electrically, either directly or by electro-magnetic valves.

The sensing means 12 preferably includes a pair of sensors 18 and 20 that are disposed on opposite sides of the combine. The sensors 18 and 20 measure one or more parameters of the crop flowing through the combine and generate digital or analog signals which are transmitted to the controller 14. The sensors 18 and 20 may sense such parameters as the crop density, the height of the mat of crop material moving through the machine, or even grain loss. Such sensors are commercially available or described in the patent literature. For example, the sensors could be commercially available pressure gauges that sense the air pressure from the combine cleaning system blower, or they could be capacitance-type proximity switches responsive to the crop material accumulating to a depth wherein they actuate the switch, or even photo-electric sensors that sense the height of a pile of crop material. The latter sensors are known for sensing the height of crop material on the paddles of the tailings elevator in a combine. Grain loss monitors that produce an electric signal responsive to the amount of grain going out the rear of the combine are also well known.

Figure 2:
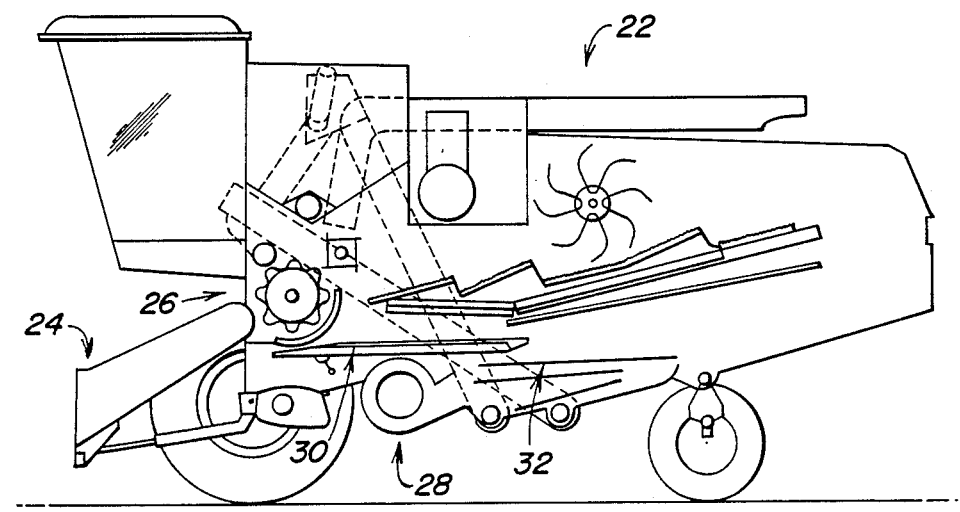
FIG. 2 is a schematic fore-and-aft vertical cross section through a combine showing the crop separating mechanisms.

A conventional combine 22 is schematically shown in FIG. 2. As is well known, the combine includes a forwardly extending feeder house 24 through which crop material is fed from a harvesting header (not shown) that is normally mounted on the front end of the feeder house. The header removes crop material from the field and the crop material, which includes grain and other materials, such as husk, chaff, and straw from which the grain is separated, is delivered rearwardly through the feeder house to an axially transverse threshing cylinder having an associated concave, both of which are indicated generally by the numeral 26. After the crop is threshed by the threshing mechanism 26, it is delivered to a separating mechanism as indicated generally by the numberal 28. Grain and other crop material passing through the concave of the threshing mechanism 26 fall on a generally horizontal grain pan 30 that extends between the opposite side walls of the combine body and oscillates to propel the grain and other crop material rearwardly along the grain pan. The crop material that does not pass through the concave of the threshing mechanism is propelled upwardly and rearwardly onto conventional straw walkers, which move the bulk of the material out the reat of the combine, while separating grain and other finer materials from the straw and the like. The grain and other material passing downwardly through the straw walkers falls downwardly on the rear portion of the grain pan 30. The grain pan 30 propels the crop material rearwardly onto a pair of sieves 32, which have openings through which a blast of air is delivered from a conventional cleaning fan that is disposed below the grain pan 30 and forwardly of the sieves 32. As is well known, the chaff and lighter material entrained in the air blast are blown out the reat of the combine, while the heavier grain falls through the sieves onto a conventional clean grain collecting mechanism.

Figure 3:
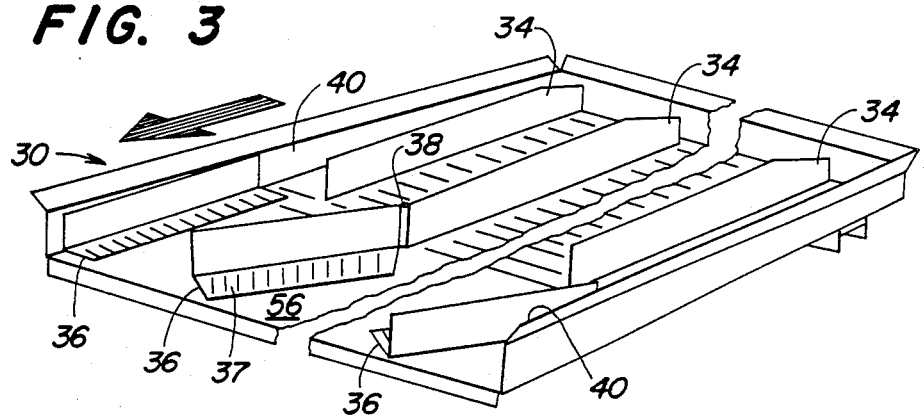
FIG. 3 is a perspective view of the crop conveying grain pan for moving crop material to the cleaning mechanism in the combine and including the adjustable vanes according to the invention.
Figure 4:
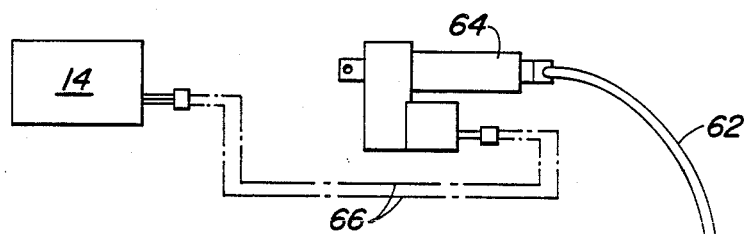
FIG. 4 is a schematic plan view of the adjustable vanes on the grain pan and the control system for adjusting the vanes.
Figure 4:
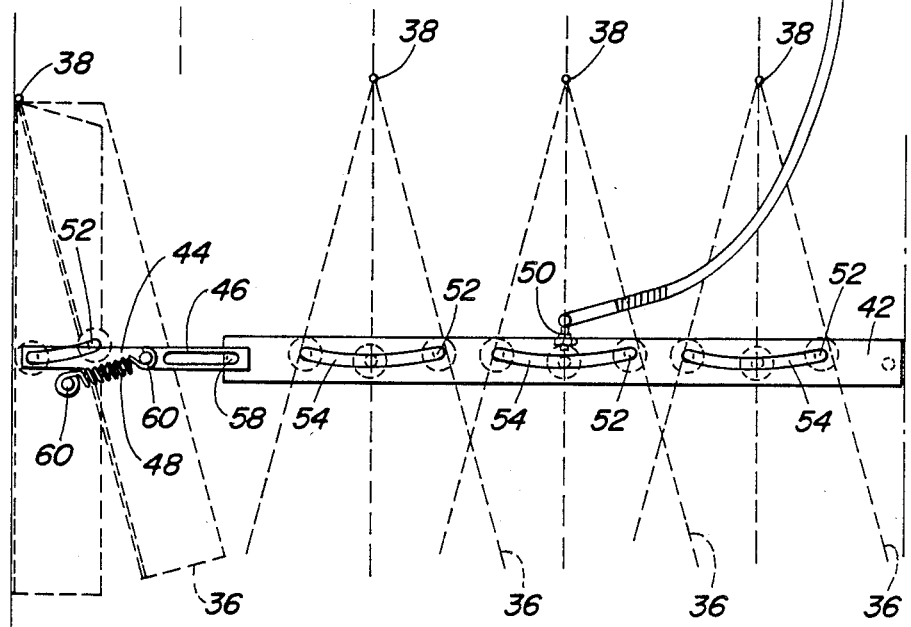

As shown in FIG. 3, the grain pan 30 is relatively flat and trough shaped, with an open rear end, the grain being conveyed along the grain pan in the direction of the large arrow in FIG. 3. The forward end of the grain pan is provided with a plurality of vertical, fore-and-aft extending and laterally spaced vanes 34, only three vanes being shown in FIG. 3, since a central portion of the grain pan is broken away in FIG. 3. Rearwardly or downstream of the fixed guide vanes 34 are a plurality of adjustable guide vanes 36, which are schematically shown in plan view in FIG. 4. The adjustable guide vanes are attached to the rear ends of the fixed guide vanes by vertical pivots or hinges 38, except for the two outside adjustble vanes 36 that are pivoted to the respective opposite side walls 40 of the grain pan by the vertical hinges 38, rather than being pivoted to the outside fixed vanes 34. Except for the two outer fixed guide vanes 34, an adjustable guide vane 36 is attached to the rear end of each fixed guide vane 34. Only the left-hand outeer adjustable guide vane 36 is shown in FIG. 4, since the right-hand outer guide vane is a mirror image of the left-hand outer adjustable guide vane 36. As is apparent, the adjustable guide vanes 36 are adjustable in an arc about the respective hinges 38 to a limited degree in either direction from the straight fore-and-aft direction, the outer limits of the adjustment being shown in dotted lines in FIG. 4. As is also apparent, the outer guide vanes swing only inwardly from the side walls 40, so that their range of movement is only half that of the inner adjustable guide vanes. The placement of the outer adjustable guide vanes adjacent the walls 40 rather than at the rear end of the outer two fixed guide vanes 34 prevents blockage of the outer passages when the rear ends of the adjustable guide abut the side walls 40.

The means for adjustment of the adjustble guide vanes 36 is shown in FIG. 4. A transverse adjusting member 42, in the form of a rod or L-shaped strut, is disposed under the floor of the grain pan 30, and a bracket or extension member 44 extends outwardly from the opposite ends of the member 42, only the left-hand member 44 being shown in FIG. 4. Each member 44 is provided with a laterally extending slot 46 and a spring 48. A ball-type pivot 50 extends forwardly from a central portion of the adjusting member 42. Extending upwardly from the adjusting member 42 are vetical pins 52 which extend through arcuate slots 54 in the bottom of the grain pan. The rearward portion of the bottom of the grain pan which includes the arcuate slots, is indicated by the numeral 56 in FIG. 3. Each pin 52 is attached to an adjustable guide vane 36. As best shown in FIG. 3, each adjustable guide vane also has a horizontal leg 37 adjacent the rearward portion 56, and the horizontal legs 37 of the vanes are provided with transverse ribs similar to the transverse ribs on the forward portion of the grain pan floor, the ribs in conjunction with the oscillating motion of the grain pan serving to throw the grin rearwardly along the grain pan as the grain pan oscillates. The opposite ends of the slots 54 in the floor portion 56 limit the movement of the adjustable vanes between their extreme positions, as is apparent in FIG. 4.

Each member 44 engages a vertical pin 58 that extends from the adjusting member 52 through the slot 46 in the member 44. Each pre-loaded spring 48 is attached at one end to the grain pan floor by an upright pin 60 and at its other end to the member 44 by another pin 60. As is apparent, the spring 48 biases the member 44 toward the adjacent side wall, so that the pin 58 normally engages the inner end of the slot 46. When the adjusting member 42 is moved to the right, as seen in FIG. 4, all the adjustable guide vanes 36 shown in FIG. 4 are moved about their hinges 38 in a counterclockwise direction. Since the pin 58 is in contact with the inner end of the slot 46, and the member 44 engages the outer adjustable guide vane 36 by means of the pin 52, the outer adjustable guide vane 36 will similarly be rotated to the position shown in FIG. 4. However, if the adjusting member 42 is moved to the left, as seen in FIG. 4, then the outer adjustable guide vane moves about its hinge only until it engages the wall 40 and is in a straight fore-and-aft position. After that point, additional movement of the member 42 to the left will cause the pin 58 to slide along the slot 46 so that the member 44 and the outer adjustable guide vane 36 attached thereto no longer shift. As is apparent, the right-hand outer adjustable guide vane also adjusts only to the straight fore-and-aft position and moves no farther after it engages the right-hand grain pan wall 40. The ball pivot 50 on the member 42 is attached to one end of a push-pull cable 62, the other end of which is connected to a linear output electric motor of electro-hydraulic device, which is powered from and connected to the control 14 by a pair of wires 66.

In operation, the sensors 18 and 20 are mounted on opposite sides of the combine adjacent the opposite side walls 40 of the grain pan and sense the amount of crop material adjacent the respective side walls. As previously described, the sensors can be a variety of sensors which sense in some manner the amount of crop material in the outer passages of the grain pan. However, if grain loss is being measured, the sensors would be mounted at their rearward end of the sleeves rather than adjacent the grain pan. The controller 14, in response to the electric signals generated by the sensors, compares the amount of crop material on the opposite sides of the grain pan or the grain loss at the opposite sides of the sieves, and if the crop material begins to build up on the downhill side of the grain pan or the losses increase on the downhill side of the machine, the controller will sense the difference in the amount of crop material or losses between the uphill and downhill sides of the grain pan, and, in response to the different signals from the respective sensors 18 and 20, the controller will supply electric power to the electric actuator 64, which shifts the adjusting member 42 and consequently the guide vanes to deflect crop material on the grain pan toward the uphill side of the machine. Since the sensors continuously monitor the condition of the crop material, the adjustable guide vanes can be continuously adjusted to maintain the mat of crop material or losses as equal as possible on opposite sides of the grain pan. Of course, the processor can be programmed to permit some tolerance in the difference in size of the mats of crop material or losses at opposite sides of the machine and can also be adjusted to vary the amount of difference that will cause the adjustable vanes to reach their extreme positions as shown in FIG. 4.

We claim:

1. In a combine having a main separator body with opposite lateral side walls, a threshing and separating means mounted within the combine between the opposite side walls, and a generally horizontal conveyor means adapted to receive crop material from the threshing and separating means and deliver it to a cleaning means that separates grain from other crop material, the conveyor means including a generally horizontal grain pan having opposite sides adjacent the opposite side walls of the combine and a generally horizontal grain pan floor extending between the opposite sides of the grain pan, the improvement comprising:

a plurality of generally upright, fore-and-aft extending adjustable guide vanes pivotally connected to the grain pan floor and adjustable between first and second positions wherein they deflect crop material on the conveyor means toward one or the other of the opposite sides of the combine;

adjusting means connected to the adjustable vanes for swinging the vanes between their first and second positions in response to shifting of the adjusting means between first and second positions and including a generally horizontal, transverse member mounted below the grain pan floor for lateral adjustment relative thereto, and vertical pins extending upwardly from the transverse member through the floor and connected to the vanes;

electrically actuated motor means operatively connected to the adjusting means for shifting the adjusting means between its first and second positions in reponse to actuation of the motor means;

a pair of sensing means respectively mounted on the combine adjacent the opposite sides of the combine body and operative to generate an electric signal in response to a parameter of the crop material adjacent the respective side of the combine; and control means responsive to the signals from the sensor means for controlling the supply of electric power to the motor means, so that the motor means shifts the adjusting member and the adjustable vanes attached thereto between their opposite positions to deflect crop material toward one side of the combine or the other in response to a difference in the signals generated by the sensing means.

2. The invention defined in claim 1 wherein the adjusting means includes a generally horizontal transverse member mounted for lateral adjustment relative to the grain pan floor and connected to the outer adjustble vanes by a lost motion mechanism so that the outer vanes only shift laterally inwardly from their fore-and-aft positions when the transverse member is shifted.

3. The invention defined in claim 1 wherein the sensing means generate electric signals responsive to the height of crop material on the respective opposite sides of the conveyor means.

4. The invention defined in claim 1 wherein the sensing means generate electric signals responsive to the grain losses at opposite side of the cleaning means.

5. In a combine having a main separator body with opposite lateral side walls, a threshing and separating means mounted within the combine between the opposite side walls, and a generally horizontal conveyor means adapted to receive crop material from the threshing and separating means and deliver it to a cleaning means that separates grain from other crop material, the conveylor means including a generally horizontal grain pan having opposite sides adjacent the opposite side walls of the combine and a generally horizontal grain pan floor extending between the opposite sides of the grain pan, the improvement comprising:

a plurality of generally upright, fore-and-aft extending adjustable guide vanes pivotally connectd to the grain pan floor and adjustable between first and second positions wherein they deflect crop material on the conveyor means toward one or the other of the opposite sides of the combine, the conveyor means including a plurality of generally upright, fore-and-aft extending fixed vanes, extending upwardly from the grain pan floor, at least some of the adjustable vanes extending rearwardly from the fixed vanes;

adjusting means connected to the adjustable vanes for swinging the vanes between their first and second positions in response to shifting of the adjusting means between first and second positions;

electrically actuated motor means operatively connected to the adjusting means for shifting the adjusting means between its first and second positions in response to actuation of the motor means;

a pair of sensing means respectively mounted on the combine adjacent the opposite sides of the combine body and operative to generate an electric signal in response to a parameter of the crop material adjacent the respectie side of the combine; and control means responsive to the signals from the sensor means for controlling the supply of electric power to the motor means, so that the motor means shifts the adjusting member and the adjustable vanes attached thereto between their opposite positions to deflect crop material toward one side of the combine or the other in response to a difference in the signals generated by the sensing means.

6. In a combine having a main separator body with opposite lateral side walls, a threshing and separating means mounted within the combine between the opposite side walls, and a generally horizontal conveyor means adapted to receive crop material from the threshing and separately means and deliver it to a cleaning means that separates grain from other crop material, the conveyor means including a generally horizontal grain pan having opposite sides adjacent the opposite side walls of the combine and a generally horizontal grain pan floor extending between the opposite sides of the grain pan, the improvement comprising:

a plurality of generally upright, fore-and-aft extending adjustable guide vanes pivotally connected to the grain pan floor and adjustable between first and second positions wherein they deflect crop material on the conveyor means toward one or the other of the opposite sides of the combine, the adjustable guide vanes including a pair of outer guide vanes respectively mounted on the opposite sides of the grain pan, the outer vanes being adjustable only between a fore-and-aft position and a position wherein the rear ends of the vanes are offset inwardly from the respective sides of the grain pan;

adjusting means connected to the adjustable vanes for swinging the vanes between their first and second positions in response to shifting of the adjusting means between first and second positions;

electrically actuated motor means operatively connected to the adjusting means for shifting the adjusting means between its first and second positions in response to actuation of the motor means;

a pair of sensing means respectively mounted on the combine adjacent the opposite sides of the combine body and operative to generate an electric signal in response to a parameter of the crop material adjacent the respective side of the combine; and control means responsive to the signals from the sensor means for controlling the supply of electric power to the motor means, so that the motor means shifts the adjusting member and the adjustable vanes attached thereto between their opposite positions to deflect crop material toward one side of the combine or the other in response to a difference in the signals generated by the sensing means.

* * * * *